United States Patent

Morita et al.

[15] 3,668,775

[45] June 13, 1972

[54] METHOD FOR MANUFACTURING MAGNETIC HEADS

[72] Inventors: Minoru Morita, Toyonaka; Takashi Shiraki, Neyagawa; Sadao Masuoka, Hirakata, all of Japan

[73] Assignee: Matsushita Electric Industrial Co. Ltd., Osaka, Japan

[22] Filed: Feb. 9, 1970

[21] Appl. No.: 9,545

[30] Foreign Application Priority Data

Feb. 13, 1969 Japan....................................44/11273

[52] U.S. Cl. ..........................................29/603, 179/100.2 C

[51] Int. Cl. ..........................................G11b 5/42, H01f 7/06

[58] Field of Search ..............................29/603; 179/100.2 C; 346/74 MC; 340/174.1 F

[56] References Cited

UNITED STATES PATENTS

| | | | |
|---|---|---|---|
| 3,460,244 | 8/1969 | Metz | 29/603 |
| 3,543,396 | 12/1970 | Illg et al. | 29/603 |
| 3,402,463 | 9/1968 | Bos | 29/603 |
| 3,353,261 | 11/1967 | Bradford et al. | 29/603 |
| 3,400,386 | 9/1968 | Sinnott | 29/603 X |

*Primary Examiner*—John F. Campbell
*Assistant Examiner*—Carl E. Hall
*Attorney*—Stevens, Davis, Miller & Mosher

[57] ABSTRACT

A method for manufacturing magnetic heads having the tape travel surface partially covered with a non-magnetic material, comprising the steps of mounting a head core with the front side including a gap of a predetermined width substantially identical with a predetermined tape travel surface in a mating recess of the same contour as the core front formed in a non-magnetic frame member, and grinding said head core and said frame member to expose part of the core front.

1 Claim, 10 Drawing Figures

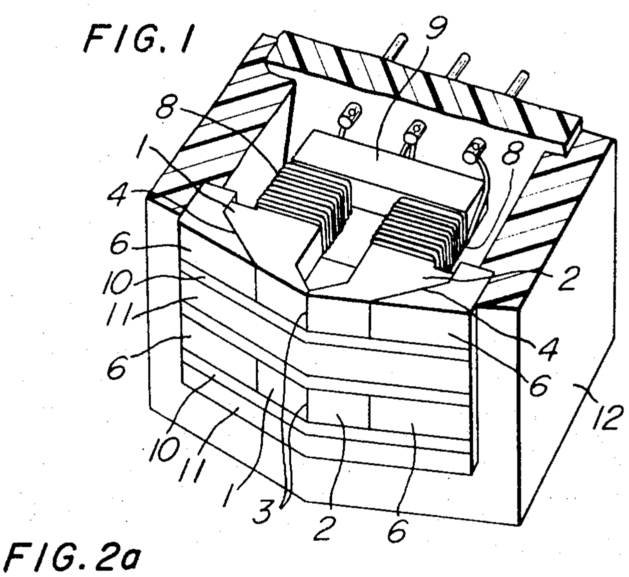
FIG. 1
FIG. 2a
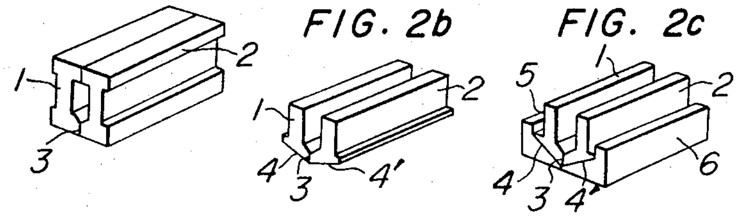
FIG. 2a, FIG. 2b, FIG. 2c
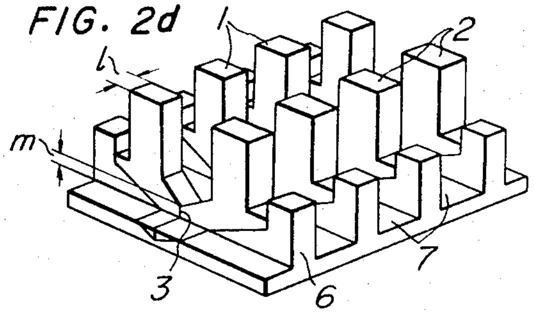
FIG. 2d
M. MORITA,
T. SHIRAKI AND
S. MASUOKA
INVENTORS
BY Stevens, Davis, Miller & Mosher
ATTORNEY

METHOD FOR MANUFACTURING MAGNETIC HEADS

The invention relates to a method for manufacturing magnetic heads, and is particularly effective for the manufacture of magnetic heads having superior characteristics for the recording and reproducing of long-wave sounds by using a sintered oxide magnetic material such as ferrite for the head core.

Distortion of the long-wave frequency characteristic of the magnetic head almost entirely depends upon the configuration of the head core. There is a kind of resonance phenomenon between the tape and the core surface along which the tape travels. This phenomenon is called the core shape effect.

The effect is related to the width of the center portion of the front surface of the head in contact with the travelling magnetic tape, and to the wavelength of the signal recorded on the tape. When the former approaches the latter, the reproduction output tends to be emphasized.

A conventional measure used to reduce the distortion of the characteristics due to the shape effect is to construct a head of such configuration that the tape gradually gets out of contact with the head core to prevent any abrupt change of the influence of the magnetic flux upon the tape.

Usually, a cylindrical surface of as large a radius as possible is chosen.

In this case, however, the contact pressure at the core gap is low compared to the tension in the tape, as the area of contact between the tape and the head is large, so that stable recording and reproduction of sound of high density, i.e. at high frequency, is difficult to reproduce, which is a disadvantage.

When the radius of the gap portion is reduced to a roof-like contour in order to increase the contact pressure, the area of contact between head and tape changes with the angle of contact between head and tape to result in different shape effects, so that stable recording and reproduction cannot be expected.

The first object of the invention is to provide a method for readily manufacturing magnetic heads, whereby the surface effect is minimized irrespective of the aforementioned contact angle.

The second object of the invention is to provide a method for readily manufacturing multi-track magnetic heads, whereby the shape effect is minimized, irrespective of the contact angle.

Figure 2E:
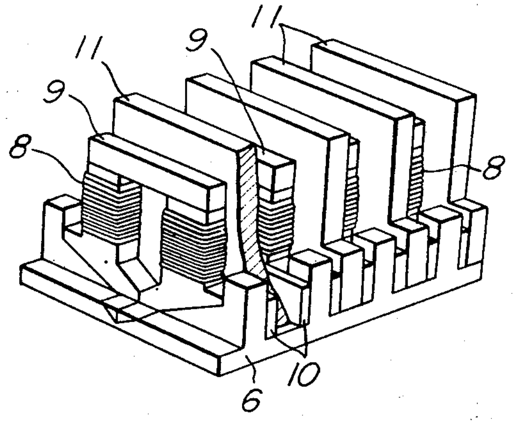
Figure 2F:
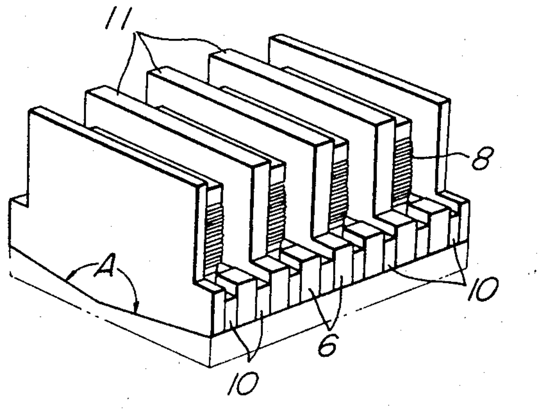
Figure 3A:
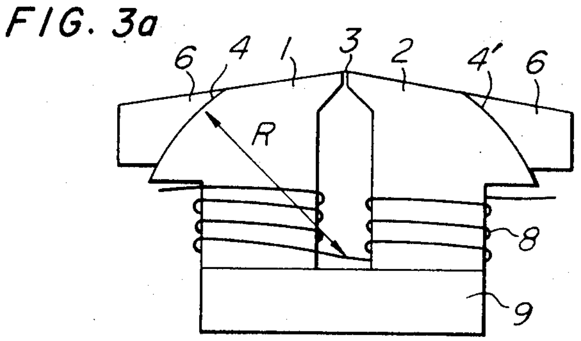
Figure 3B:
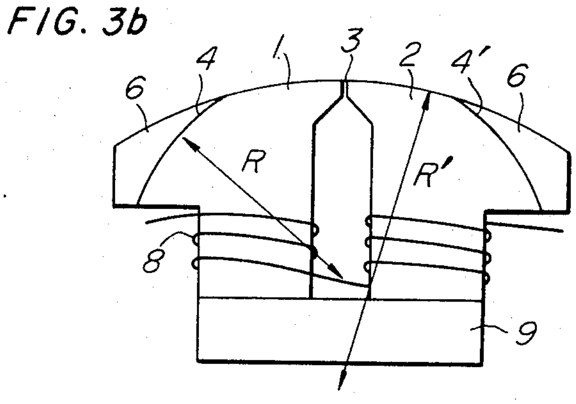
Figure 3C:
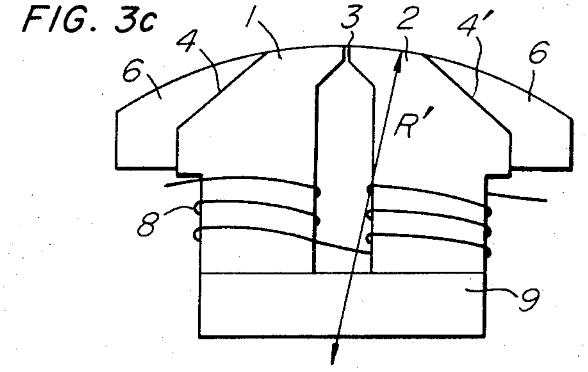

The invention is now described in conjunction with a multi-track magnetic head embodying the invention with reference to the accompanying drawings, in which:

FIG. 1 is a perspective view, partly broken away, of a multi-track magnetic head manufactured in accordance with the invention;

FIGS. 2*a* to 2*f* illustrate the steps of the manufacturing method according to the invention; and FIGS. 3*a* to 3*c* are sectional views of other embodiments of the magnetic head according to the invention.

Referring now to FIG. 2*a*, halves 1 and 2 of the eventual magnetic core having an I-shaped cross section and made of an oxide magnetic material are joined together by means of a non-magnetic material such as glass in the same manner as the usual method of manufacturing magnetic heads, thereby forming a core gap 3 of a predetermined width.

The core halves 1 and 2 are then ground on the front side into a required contour, on which the travelling magnetic tape touches the core as shown at 4 and 4' in FIG. 2*b*. The upper portion of the core is cut away.

Thereafter, the joined core halves 1 and 2 are mounted in a snugly fitting fashion in a recess 5 formed in a frame member 6 made of such non-magnetic material as composed of $Fe_2O_3$ and a member selected from a group consisting of $Al_2O_3$, MgO, $SiO_2$, $ZrO_2$, BeO and TiO and having substantially the same hardness and wear characteristics as the core halves 1 and 2, and is secured to the frame member by an adhesive, as shown in FIG. 2*c*.

Then, notches 7 extending at right angles to the gap 3 are formed in the assembly such that the tracks thus formed have a predetermined width *l*, as shown in FIG. 2*d*. The notches are of such a depth that at least the frame member is not divided and the depth *m* of the gap 3 at this instant is greater than the required gap depth of the completed head.

Then, coils 8 are wound around the legs of the core halves 1 and 2, and the pairs of the legs are magnetically short-circuited by magnetic members 9, as shown in FIG. 2*e*.

Also, a spacer 10 of a non-magnetic material together with shields 11 on opposite sides is inserted in each of the notches 7 and bonded thereto.

The assembly is then ground such that the front surfaces of the core halves 1 and 2 make an angle A, as shown in FIG. 2*f*. Finally, the assembly is housed in a casing 12, and the necessary terminal connections are made, thus completing the multi-track magnetic head as shown in FIG. 1.

FIGS. 3*a* to 3*c* illustrate respective modifications of the core. In the core shown in FIG. 3*a* the boundary faces 4 and 4' of the core halves 1 and 2 contiguous to the non-magnetic portion 6 lie in a cylindrical surface of a radius R, and the surface, along which the tape travels, assumes a roof-like contour consisting of planes and curved surfaces continuous thereto. In the core shown in FIG. 3*b* the tape travel surface lies in a cylindrical surface of a radius R' greater than the radius R of the cylindrical surface of the boundaries. In the core shown in FIG. 3c the boundaries 4 and 4' are planes, and the tape travel surface lies in the cylindrical surface of radius R'.

All these cores feature that the non-magnetic material 6 is applied onto the shoulders of the core consisting of core halves 1 and 2, and is machined together with the core portion to finish the tape travel surface into a smooth plane or curved surface with the boundaries between the core and the non-magnetic material terminating at the tape travel surface.

As has been described in the foregoing, according to the invention non-magnetic material is provided on the sloped front surfaces of the core on opposite sides of the core gap 3, which permits gradual separation of the travelling tape and the core, so that a magnetic head possessing a repressed shape effect may be readily manufactured. Also, since the core halves 1 and 2 and the non-magnetic material 6 are simultaneously finished to form the tape travel surface, a smooth plane or curved surface may be obtained.

Further, as the non-magnetic material may be used non-magnetic ferrite, which has a superior wear-resisting characteristic.

It is, of course, to be understood that the invention is applicable to single-track magnetic heads as well as to multi-track magnetic heads as in the foregoing embodiments, for the multi-track head may be divided into individual single-track portions.

What is claimed is:

1. A method for manufacturing multi-track magnetic heads having a tape travel surface comprising the steps of joining two core halves of a magnetic material to form a core assembly with a magnetic gap of predetermined width positioned lengthwise of said assembly, grinding the side of the said core assembly that includes said gap into a contour substantially identical with the desired tape travel surface, mounting the ground core assembly in a frame member of a non-magnetic material such that said ground side including said gap closely fits a counter bottom surface of a recess formed in said frame member, bonding said core assembly to said frame member, forming notches in said core assembly while leaving said frame member integral, said notches having the same width as a predetermined track interval extending at right angles to said gap such that the inter-notch portions have a predetermined track width and extending into said gap to a depth greater than or equal to the required gap depth of the completed head, inserting a shield into each of said notches, bonding said shields in place, and grinding the core assembly, said shields and said frame member in a direction opposite to that from which said notches were formed such that said core assembly is divided into a plurality of individual tape heads with gaps exposed on said tape travel surface.

* * * * *